United States Patent
Brown

(10) Patent No.: US 10,980,259 B1
(45) Date of Patent: Apr. 20, 2021

(54) FINELY TEXTURED BEEF PRODUCT AND PROCESS

(71) Applicant: Cargill, Incorporated, Wayzata, MN (US)

(72) Inventor: Ted L. Brown, Haven, KS (US)

(73) Assignee: Cargill, Incorporated, Wayzata, MN (US)

(*) Notice: Subject to any disclaimer, the term of this patent is extended or adjusted under 35 U.S.C. 154(b) by 0 days.

(21) Appl. No.: 15/674,223

(22) Filed: Aug. 10, 2017

Related U.S. Application Data

(60) Provisional application No. 62/373,117, filed on Aug. 10, 2016.

(51) Int. Cl.
  *A23L 13/60* (2016.01)
  *A23L 5/00* (2016.01)

(52) U.S. Cl.
  CPC ............ *A23L 13/60* (2016.08); *A23L 5/00* (2016.08); *A23V 2002/00* (2013.01)

(58) Field of Classification Search
  CPC .......... A23L 13/00; A23L 13/20; A23L 13/30; A23B 4/005; A23B 4/16; A23J 1/02; A23J 3/04; A23V 2002/00; A23V 2250/542; A23V 2300/14; A23V 2300/40
  See application file for complete search history.

(56) References Cited

U.S. PATENT DOCUMENTS

| | | | |
|---|---|---|---|
| 5,871,795 A | 2/1999 | Roth | |
| 5,939,112 A * | 8/1999 | Katayama | A23B 4/023 426/302 |
| 7,001,630 B2 * | 2/2006 | Bender | A23L 13/432 426/281 |
| 8,080,270 B1 | 12/2011 | Schaefer et al. | |
| 8,158,176 B2 | 4/2012 | Steiner | |
| 9,161,555 B2 * | 10/2015 | Kelleher | A23J 1/02 |
| 2009/0004353 A1 * | 1/2009 | Topps | A23B 4/0235 426/533 |
| 2009/0123615 A1 * | 5/2009 | Hudson | A23J 1/02 426/281 |
| 2010/0009048 A1 * | 1/2010 | Hultin | A23L 13/428 426/281 |
| 2012/0027899 A1 * | 2/2012 | Topps | A23L 13/428 426/281 |
| 2013/0259990 A1 | 10/2013 | Topps | |

* cited by examiner

*Primary Examiner* — Subbalakshmi Prakash

(57) ABSTRACT

Animal trimmings are converted to a finely textured beef product by heating ground animal trimmings to a temperature sufficient to liquefy fat in the animal trimmings and less than a temperature to significantly cook the animal trimmings thereby forming a heated slurry, separating at least a portion of the liquid fat from the heated slurry to form a lean textured beef slurry having a fat content of less than about 30% by weight and adding sodium carbonate to the lean textured beef slurry in an amount sufficient to provide a finely textured beef product comprising sodium carbonate in an amount of from about 0.02 to about 0.1% by weight. Finely textured beef products and mixed meat products comprising the finely textured beef products are also described.

15 Claims, No Drawings

FINELY TEXTURED BEEF PRODUCT AND PROCESS

FIELD

The present invention relates to finely textured beef and a process for preparing the finely textured beef.

BACKGROUND

Finely textured beef (FTB), also referred to as fat reduced beef, is a lean edible by-product derived primarily from fatty beef trimmings. The raw material for FTB includes trimmings derived from boning and fabrication operations of a beef carcass. The raw material can be high in fat but contains visible lean meat. FTB is formed when the lean meat is separated through a rendering process to achieve a relatively low-fat lean meat product. Rendering is the heating of meat products to separate out the meat from the fat. Production of FTB changes the original trimmings from a fatty, low quality, low value product to a relatively lean and valuable product. Examples of processes for preparing finely textured beef are described in U.S. Pat. No. 8,080,270 to Schaefer, et al. and U.S. Pat. No. 8,158,176 to Steiner.

The government provides that a certain quality of meat product obtained from animal trimmings can be used undeclared in meat products of the same species. For example, "finely textured beef" and "lean finely textured beef" can be used in ground beef without being declared on the label, "Finely textured meat" is required to have a hit content of less than 30%; a protein content of greater than 14%, by weight; a protein efficiency ratio (PER) of 2.5 or higher, or an essential amino acids (EAA) content of 33% of the total amino acids or higher; must be prepared in a federally inspected plant; must not have a product temperature during processing exceeding 43° C. (about 110° F.); must be frozen in less than 30 minutes after processing; must not allow a significant increase in bacterial numbers; and must not be treated with chemicals or additives. "Lean finely textured meat" is required to have a fat content of less than 10%, by weight, and complies with the other requirements of "finely textured meat."

U.S. Pat. No. 5,871,795 to Roth is directed to a method of improving the quality of a meat product by contacting the surface of the meat product with a pH increasing gas comprising $NH_3$ gas at an operating pressure at or above the vapor pressure of the pH increasing gas at the temperature of the meat product. The quality benefit provided by this process is "reducing or controlling pathogenic microbe content in the material."

SUMMARY

It has been found addition of sodium carbonate during preparation of finely textured beef greatly improves not only the water binding characteristics of final mixed meat products prepared using the finely textured beef, but additionally improves the cohesive properties of final mixed meat products (i.e., binding of meat products such as, for example, meat patties, encased meats, meatloaf, and the like) and, most surprisingly, the cook yield of final mixed meat products. The property of meat binding is particularly important for the organoleptic properties of the final product being consumed. The property of cook yield is particularly important for businesses that cook and serve customers final mixed meat products, such as restaurants and institutional food service organizations. These businesses place high value on predictable cooked product weight relative to weight of starting material. Increased cook yield enhances this predictability. Additionally, these businesses purchase large amounts of final mixed meat product, and highly value increased cook yield of product to be sold to their customers based on volume of sales. Because of these factors, increased cook yield of even one percent by weight is an important benefit in this industry In an aspect of the present invention, a method for converting animal trimmings to a finely textured beef product comprises heating ground animal trimmings to a temperature sufficient to liquefy fat in the animal trimmings and less than a temperature to significantly cook the animal trimmings thereby forming a heated slurry, separating at least a portion of the liquid fat from the heated slurry to form a lean textured beef slurry having a fat content of less than about 30% by weight and adding sodium carbonate to the lean textured beef slurry in an amount sufficient to provide a finely textured beef product comprising sodium carbonate in an amount of from about 0.02 to about 0.1% by weight. In an aspect of the present invention, the fat content of the finely textured beef product is the same as the fat content of the intermediate heated slurry.

In an aspect of the present invention, a method for converting animal trimmings to a finely textured beef product is provided that enhances the weight percent of protein in the finely textured beef product as compared with the weight percent of protein in the intermediate heated slurry. In an aspect of the present invention, this method comprises a) heating ground animal trimmings to a temperature sufficient to liquefy fat in the animal trimmings and less than a temperature to significantly cook the animal trimmings thereby forming a heated slurry;

(b) separating the heated slurry into a solids stream and a liquids stream, the solids stream comprising an increased weight percent of protein compared with the weight percent of protein in the heated slurry, and the liquids stream containing an increased weight percent of fat and water soluble proteins compared with the weight percent of fat and water soluble protein in the heated slurry;

(c) separating the liquids stream into a heavy phase and a light phase, the heavy phase comprising an increased weight percent of moisture and water soluble proteins compared to the weight percent of moisture and water soluble proteins in the liquids stream, and the light phase containing an increased weight percent of tallow compared with the weight percent of fat in the liquids stream; and (d) combining the solids stream from the heated slurry and the heavy phase from the liquids stream thereby forming a finely textured beef product; wherein sodium carbonate is added to the solids stream after separation from the heated slurry or to the finely textured beef product in an amount sufficient to provide a finely textured beef product comprising sodium carbonate in an amount of from about 0.02 to about 0.1% by weight.

Products made by any of the processes described herein are also aspects of the present invention.

In an aspect of the present invention, a finely textured beef product comprises sodium carbonate in an amount of from about 0.02 to about 0.1% by weight and having a fat content of less than about 30% by weight.

In an aspect of the present invention, a mixed meat product comprises a mixture of ground beef and the finely textured beef product described herein, wherein the finely textured beef product is present as at least 10% of the mixed meat product.

DETAILED DESCRIPTION

The aspects of the present invention described below are not intended to be exhaustive or to limit the invention to the precise forms disclosed in the following detailed description. Rather a purpose of the aspects chosen and described is by way of illustration or example, so that the appreciation and understanding by others skilled in the art of the general principles and practices of the present invention can be facilitated.

Generally, "animal trimmings" refers to the tissue cut away from conventional cuts or parts of the carcasses of meat producing animals during butchering operations in packing houses and the like. The conventional cuts or parts are generally sold directly to consumers or further processed by, for example, grinding into ground beef. The tissue remaining after the conventional cuts are removed, or after the conventional cuts have been further trimmed, generally has a fat content which is too high for human consumption as meat, but contains protein which can be recovered. The animal trimmings may in an aspect be obtained from any "meat producing animals," which are animals which are conventionally processed to provide meat. Such animals include beef, pork, poultry, lamb, deer, fish, and the like. In a particularly preferred aspect of the present invention, the animal trimmings are beef.

The animal trimmings can include any part of an animal which is trimmed away from the carcass of the animal or the cuts. The animal trimmings can include all the parts normally found in an animal, including adipose tissue, fat, lean, ligaments, tendons, bone parts, and the like. It is generally desirable that if components other than fat, lean, and moisture are present, they are present in small quantities and/or can be removed in the desinewing step or by hand, if desired, or can be left therein if their presence does not adversely affect the properties of the meat product. If large amounts of certain components are present, it may be desirable to have them removed by conventional separation techniques prior to processing according to the present invention. For example, it is generally desirable not to have large amounts of bone present or large amounts of low quality ligaments.

It should be kept in mind that "meat producing animals" are animals which are conventionally processed to provide meat. Such animals include beef, pork, poultry, lamb, deer, fish, and the like. The lean material can be referred to as protein-containing material, and can be in the form of water soluble protein which tends to give the meat its color, salt soluble protein which include muscle fiber, and nonsoluble protein which are generally the connective tissue which surrounds muscle fiber and which attach the muscle fibers to ligaments. Of particular interest for purposes of the present invention is the presence of the water soluble protein and the salt soluble protein in the fatty tissue within the fat trimmings. By separating this material from the animal trimmings, a high quality meat product can be provided.

Animal trimmings which can be used in the present invention preferably have an average fat content of between about 50 and 80% by weight, and more preferably between about 60 and 70% by weight. The lean content of the animal trimmings is preferably between about 20 and 50% by weight, and more preferably between about 30 and 40% by weight. In order to ensure reliable and consistent results, it is preferable that the lean content of the animal trimmings is at least 37% by weight, and even more preferably at least 39% by weight. It should be kept in mind that the lean content includes protein and moisture.

The animal trimmings in one aspect of the present invention are processed in a controlled atmosphere environment to limit exposure of the animal trimmings to oxygen. By limiting access to the atmosphere, oxidation of the meat can be limited thereby reducing or eliminating off flavors.

In an aspect of the invention, the animal trimmings may first undergo a desinewing step that may or may not remove all of the connective tissue. Generally, the desinewing step removes a large amount of the low quality protein component from the animal trimmings. By separating the sinew from the beef trimmings, the proportion of essential amino acids to total amino acids in the final meat product can be increased. Accordingly, it should be appreciated that the essential amino acids content and the protein efficiency ratio of the final meat product can be adjusted, as desired, based upon the desinewing step.

The animal trimmings are in an aspect provided in the form of a slurry, and are fed into a particle reducer where the particle sizes in the slurry are reduced to form a ground animal trimmings dispersion having a roughly uniform consistency. The particle reducer can in an aspect be a commercially available particle reducer such as the Commitrol™ particle reducer manufactured by Urschel Laboratories Co.

The ground animal trimmings are heated to a temperature sufficient to liquefy fat in the animal trimmings and less than a temperature to significantly cook the animal trimmings thereby forming a heated slurry. In an aspect, the ground animal trimmings are heated to a temperature in the range of about 32° C. to about 50° C. (about 90° F. to about 120° F.) At least a portion of the liquid fat is separated from the heated slurry so that the remaining portion of the heated slurry is a lean textured beef slurry having a fat content of less than about 30% by weight. In an aspect, the lean textured beef slurry has a fat content of less than about 25% by weight. In an aspect, the lean textured beef slurry has a fat content of less than about 15% by weight. In an aspect, the lean textured beef slurry has a fat content of from about 1 to about 10% by weight. In an aspect, the lean textured beef slurry has a fat content of from about 1 to about 7% by weight. In an aspect, the lean textured beef slurry has a fat content of from about 1 to about 5% by weight. In an aspect of the present invention, the fat content of the finely textured beef product is the same as the fat content of the intermediate heated slurry.

The liquid fat may be separated from the heated slurry by any appropriate technique, such as centrifuging or decanting.

Sodium carbonate is added to the lean textured beef slurry in an amount sufficient to provide a finely textured beef product comprising sodium carbonate in an amount of from about 0.02 to about 0.1% by weight. It has been found that addition of sodium carbonate after separation of the fat from the intermediate heated slurry is preferable, because addition of sodium carbonate prior to separation of the fat from the intermediate heated slurry adversely affects the separation process.

In an aspect, sodium carbonate is added to the lean textured beef slurry in an amount sufficient to provide a finely textured beef product comprising sodium carbonate in an amount of from about 0.03 to about 0.05% by weight.

Reducing the number and amount of additives in food products is perceived to be highly advantageous in the food industry. According to the United State Food and Drug Administration definition, processing aids are substances that have no technical or functional effect in a finished food but may be present in that food by having been used as ingredients of another food in which they had a technical effect. In an aspect, sodium carbonate and water are the only non-meat sourced processing aids present in the finely textured beef product. In an aspect, sodium carbonate and water are the only non-meat sourced ingredients present in the finely textured beef product.

In an aspect of the present invention, a method for converting animal trimmings to a finely textured beef product is provided that enhances the weight percent of protein in the finely textured beef product as compared with the weight percent of protein in the intermediate heated slurry and further comprising addition of sodium carbonate. An example of aspects of such a process is described in U.S. Pat. No. 8,080,270, which is incorporated by reference for the purpose of describing the system and methodology for enhancing the weight percent of protein in the finely textured beef product as compared with the weight percent of protein in the intermediate heated slurry.

In this aspect of the present invention, this method comprises a first step of heating ground animal trimmings to a temperature sufficient to liquefy fat in the animal trimmings and less than a temperature to significantly cook the animal trimmings thereby forming a heated slurry as described above. This heated slurry is separated into a solids stream and a liquids stream, the solids stream comprising an increased weight percent of protein compared with the weight percent of protein in the heated slurry, and the liquids stream containing an increased weight percent of fat and water soluble proteins compared with the weight percent of fat and water soluble protein in the heated slurry. The liquids stream is separated into a heavy phase and a light phase, the heavy phase comprising an increased weight percent of moisture and water soluble proteins compared to the weight percent of moisture and water soluble proteins in the liquids stream, and the light phase containing an increased weight percent of tallow compared with the weight percent of fat in the liquids stream. The solids stream from the heated slurry is combined with the heavy phase from the liquids stream thereby forming a finely textured beef product. Sodium carbonate is added to the solids stream after separation from the heated slurry, or to the finely textured beef product in an amount sufficient to provide a finely textured beef product comprising sodium carbonate in an amount of from about 0.02 to about 0.1% by weight.

In an aspect, the finely textured beef product comprises sodium carbonate in an amount of from about 0.03 to about 0.05% by weight. In an aspect, the finely textured beef product has a fat content of less than about 30% by weight. In an aspect, the finely textured beef product has a fat content of less than about 25% by weight. In an aspect, the finely textured beef product has a fat content of less than about 15% by weight. In an aspect, the finely textured beef product has a fat content of from about 1 to about 10% by weight. In an aspect, the finely textured beef product has a fat content of from about 1 to about 7% by weight. In an aspect, the finely textured beef product has a fat content of from about 1 to about 5% by weight.

In an aspect, the finely textured beef product made by any of the above processes or aspects thereof is cooled or frozen, for example, on a freeze apparatus such as a Freeze Wheel System sold by Reno Technology. The cooled or frozen finely textured beef product is then packaged for storage or sale.

In an aspect, the present invention relates to the finely textured beef product made by any of the processes, including combinations of various aspects of the processes, described herein.

In an aspect, the present invention relates to a finely textured beef product comprising sodium carbonate in an amount of from about 0.02 to about 0.1% by weight and having a fat content of less than about 30% by weight. In an aspect, the finely textured beef product comprises sodium carbonate in an amount of from about 0.03 to about 0.05% by weight. In an aspect, the finely textured beef product comprises sodium carbonate in an amount effective to provide a finely textured beef product having a pH of from about 6.5 to about 8. In an aspect, the finely textured beef product comprises sodium carbonate in an amount effective to provide a finely textured beef product having a pH of from about 7 to about 7.5. In an aspect, the finely textured beef product comprises sodium carbonate in an amount effective to provide a finely textured beef product having a moisture content of from about 75% to about 81% by weight. In an aspect, the finely textured beef product comprises sodium carbonate in an amount effective to provide a finely textured beef product having a cook yield that is from about 1 to about 10% higher by weight than a like finely textured beef product not containing sodium carbonate. In an aspect, the finely textured beef product comprises sodium carbonate in an amount effective to provide a finely textured beef product having a cook yield that is from about 1 to about 8% higher by weight than a like finely textured beef product not containing sodium carbonate.

In an aspect, the finely textured beef product has a fat content of less than about 30% by weight. In an aspect, the finely textured beef product has a fat content of less than about 25% by weight. In an aspect, the finely textured beef product has a fat content of less than about 15% by weight. In an aspect, the finely textured beef product has a fat content of from about 1 to about 10% by weight. In an aspect, the finely textured beef product has a fat content of from about 1 to about 7% by weight. In an aspect, the finely textured beef product has a fat content of from about 1 to about 5% by weight.

In an aspect, the meat product has a fat content of less than 30%; a protein content of greater than 14%; and a protein efficiency ratio of 2.5 or higher, and an essential amino acids content of at least 33% of the total amino acids.

In an aspect, sodium carbonate and water are the only non-meat sourced processing aids present in the finely textured beef product.

In an aspect, the present invention relates to a mixed meat product comprising a mixture of ground beef and any of the finely textured beef products as described above, wherein the finely textured beef product is present as at least 10% of the mixed meat product. It has been discovered that the advantages of cohesive properties of final mixed meat products (i.e., meat binding) and the cook yield of final mixed meat products are particularly obtained when the finely textured beef product is present as at least 10% of the mixed meat product. In an aspect, the finely textured beef product is present as at least 20% of the mixed meat product. In an aspect, the finely textured beef product is present as from about 10 to about 35% of the mixed meat product.

In an aspect, sodium carbonate and water are the only non-meat sourced processing aids present in the mixed meat product. In an aspect, sodium carbonate and water are the only non-meat sourced ingredients present in the mixed meat product.

EXAMPLES

Representative embodiments of the present invention will now be described with reference to the following examples that illustrate the principles and practice of the present invention.

Example Set I

A. Finely Textured Beef Preparation

Finely Textured Beef was prepared, with addition of the processing aid ingredients as follows:

Test Lot 1 (T1)—Control (no added processing aids)
Test Lot 2 (T2)—Ammonia/ammonium hydroxide (FTB sourced from Beef Products, Inc.)
Test Lot 3 (T3)—10% Sodium Carbonate
Test Lot 4 (T4)—6% Sodium Metasilicate (Avguard XP™)
Test Lot 5 (T5)—10% Potassium Hydroxide (Syntrx pH Plus™)

B. Patty Preparation

Hamburger patties comprising ground beef and finely textured beef at an FTB inclusion content of 25% by weight. The patties were formulated to provide a 71% lean content.

C. Analysis Methods

All samples were analyzed for pH, Fat, Moisture, Protein, thiobarbituric acid values (TBA) and Sodium.

Tube Cook yields and bind testing used the following methodologies.

a. Twenty 40 gram samples of each treatment were weighed into 50 ml centrifuge tubes. All treatment sample tubes were evenly divided into five different batches to generate 5 replications of testing.
b. All samples were centrifuged to a speed of 1000 rpm for 1 second to achieve same level of compaction.
c. Each replication of sample tubes was cooked for 1 hour in a water bath at 160° F.
d. Following cooking, all samples were centrifuged at 3500 rpm for 2 minutes.
e. Supernatant was removed from the meat plug.
f. Samples were refrigerated overnight. Meat plug was weighed to determine cook yield.
g. Shear force analysis was completed in duplicate on each meat plug.

Ten Patty combined Cook yields and bind testing a. Thirty patty samples of each treatment were weighed in groups of ten patties before and after cooking to determine cook patty yield.
b. Patties were cooked on a flat top grill at 350° F. for 5 minutes, 2.5 minutes per side.
c. Patties were allowed to rest for 3 minutes before measuring bind.
d. Patty bind was measured by the amount of grams force needed to pull the patty apart using Dillon model GTX scale.

Individual Patty Cook yields a. Eighty patty samples of treatment T1, T2 and T3 were weighed individually before and after cooking to determine single cook patty yield.
b. Patties were cooked on a flat top grill at 350° F. for 5 minutes, 2.5 minutes per side.

Hedonic Analysis

Patties made and cooked as indicated were evaluated by a trained panel, for flavor, juiciness, texture or overall acceptability. Panel members assigned a score, which was averaged to provide a numerical value for each aspect evaluated.

D. Results

TABLE 1

Hedonic Scores

| | Ammonia/ ammonium hydroxide | Potassium Hydroxide | Sodium Meta- silicate | Sodium Carbonate | Control |
|---|---|---|---|---|---|
| Overall Difference | $1.24^a$ | $1.76^a$ | $1.46^a$ | $1.54^a$ | $1.42^a$ |
| Overall Acceptability | $6.38^a$ | $6.54^a$ | $6.76^a$ | $6.82^a$ | $6.44^a$ |
| Overall Flavor | $6.36^a$ | $6.46^a$ | $6.72^a$ | $6.74^a$ | $6.36^a$ |
| Overall Juiciness | $6.24^a$ | $6.52^a$ | $6.38^a$ | $6.66^a$ | $6.44^a$ |
| Overall Texture | $6.38^a$ | $6.34^a$ | $6.52^a$ | $6.66^a$ | $6.52^a$ |

Level of significance for grouping (Turkey): 5%

Means within a column with different letter are significantly different at a=5%. Scale used: 1 dislike extremely, 2 dislike very much, 3 dislike moderately, 4 dislike slightly, 5 neither like nor dislike, 6 like slightly, 7 like moderately, 8 like very much, 9 like extremely.

TABLE 2

Sample data

| Sample Description | Average % Fat Ankom | Average % Moisture Ankom | TBA Value | Sodium (mg/100 g) | Food Scan % Fat | Food Scan % Protein | Food Scan % Moisture | Food Scan % Salt | pH |
|---|---|---|---|---|---|---|---|---|---|
| T1 Control | 26.05671 | 58.496218 | 0.659533 | 72.6134 | 25.75137 | 15.3577 | 57.8715546 | 0.1843964 | 6.15 |
| T2 Ammonia/ ammonium hydroxide | 25.055377 | 59.693581 | 0.762085 | 80.909748 | 24.64176 | 16.03317 | 59.6636705 | 0.6527196 | 6.10 |
| T3 Sodium Carbonate | 28.887532 | 56.184717 | 0.41293 | 74.686389 | 28.53469 | 15.37952 | 56.082078 | −0.3955738 | 6.57 |
| T4 Sodium Metasilicate | 27.023479 | 58.383224 | 0.447418 | 93.253115 | 27.3356 | 15.081 | 57.7769752 | −0.1818212 | 6.43 |
| T5 Potassium Hydroxide | 27.689569 | 57.614749 | 0.527588 | 98.755033 | 27.95646 | 15.0181 | 57.2659709 | −0.4688038 | 6.54 |

TABLE 3

Sample performance data

| Treatment | Average of Springiness | Average of Cohesiveness | Average of Gumminess | Average of Chewiness | Average of Resilience | Average of Hardness |
|---|---|---|---|---|---|---|
| T1 Control | 0.817 | 0.421 | 1910.095 | 1565.010 | 0.177 | 4500.374 |
| T2 Ammonia/ ammonium hydroxide | 0.817 | 0.413 | 2017.871 | 1643.095 | 0.170 | 4792.347 |
| T3 Sodium Carbonate | 0.838 | 0.442 | 2395.421 | 2005.251 | 0.183 | 5369.461 |
| T4 Sodium Metasilicate | 0.831 | 0.450 | 2507.661 | 2085.047 | 0.189 | 5538.804 |
| T5 Potassium Hydroxide | 0.828 | 0.437 | 2356.742 | 1954.213 | 0.184 | 5354.916 |

TABLE 4

Response % cook yield
Treatment Least Squares Means Table

| Treatment | Least Sq Mean | Std Error | Mean |
|---|---|---|---|
| T1 Control | 62.5 | 0.457 | 62.50 |
| T2 Ammonia/ ammonium hydroxide | 61.75 | 0.457 | 61.75 |
| T3 Sodium Carbonate | 64.00 | 0.457 | 64.00 |
| T4 Sodium Metasilicate | 62.13 | 0.457 | 62.13 |
| T5 Potassium Hydroxide | 62.50 | 0.457 | 62.50 |

TABLE 5

% cook yield LSMeans Differences Student's t

| Treatment | Level | Least Sq Mean |
|---|---|---|
| T3 Sodium Carbonate | A | 64.00 |
| T1 Control | B | 62.50 |
| T5 Potassium Hydroxide | B | 62.50 |
| T4 Sodium Metasilicate | B | 62.13 |
| T2 Ammonia/ ammonium hydroxide | B | 61.75 |

Levels not connected by same letter are significantly different. $\alpha = 0.050$

TABLE 6

Patty Response grams of force Least Squares Means Table

| Treatment | Least Sq Mean | Std Error | Mean |
|---|---|---|---|
| T1 Control | 487.80 | 20.67 | 487.800 |
| T2 Ammonia/ ammonium hydroxide | 544.27 | 20.67 | 544.267 |
| T3 Sodium Carbonate | 693.60 | 20.67 | 693.600 |
| T4 Sodium Metasilicate | 623.33 | 20.67 | 623.333 |
| T5 Potassium Hydroxide | 588.77 | 20.67 | 588.767 |

TABLE 7

Patty grams of force LSMeans Differences Student's t

| Treatment | Level | Least Sq Mean |
|---|---|---|
| T3 Sodium Carbonate | A | 693.60 |
| T4 Sodium Metasilicate | B | 623.33 |
| T5 Potassium Hydroxide | B C | 588.77 |
| T2 Ammonia/ ammonium hydroxide | C D | 544.27 |
| T1 Control | D | 487.80 |

Levels not connected by same letter are significantly different. $\alpha = 0.050$

TABLE 8

Patty Cook Yields (10 patties combined)

| Treatment | Average % patty Cook Yield |
|---|---|
| T1 Control | 58.38 |
| T2 Ammonia/ ammonium hydroxide | 61.24 |
| T3 Sodium Carbonate | 62.81 |
| T4 Sodium Metasilicate | 60.03 |
| T5 Potassium Hydroxide | 60.37 |

TABLE 9

Individual patty cooked Least Squares Means

| Level | Least Sq Mean | Std Error | Mean |
|---|---|---|---|
| T1 Control | 58.828250 | 0.22231747 | 58.8283 |
| T2 Ammonia/ ammonium hydroxide | 61.200375 | 0.22231747 | 61.2004 |
| T3 Sodium Carbonate | 61.465432 | 0.22094087 | 61.4654 |

TABLE 10

Individual LSMeans Differences Student's t

| Sample | Level | Least Sq Mean |
|---|---|---|
| T3 Sodium Carbonate | A | 61.465432 |
| T2 Ammonia/ ammonium hydroxide | A | 61.200375 |
| T1 Control | B | 58.828250 |

Levels not connected by same letter are significantly different. $\alpha = 0.050$

E. Discussion

Sensory hedonic test showed no statistical difference with flavor, juiciness, texture or overall acceptability (Table 1). The sodium carbonate and the sodium metasilicate FTB samples ranked highest on overall acceptability in the hedonic test. All sample results were higher on overall acceptability when compared to FTB samples containing Ammonia/ammonium hydroxide, including the control FTB product. However, there was no statistical difference.

The pH adjustment processing aids all increased the pH of the 71% ground beef formulated with FTB when compared to the control and all were at a higher pH than the Ammonia/ammonium hydroxide product (Table 2). The control and Ammonia/ammonium hydroxide treatments produced 1 to 3% less fat when compared to the other treatments (Table 2). The sodium carbonate treatment had the highest fat content, which may have contributed to the best sensory scores. The sodium values of the Ammonia/ammonium hydroxide, sodium metasilicate and potassium hydroxide treatments were above USDA standard values.

Observations from tube bind testing showed all treatments increased average measurements compared to the Control product and the Ammonia/ammonium hydroxide product tested in this patty formulation (Table 3). No statistical difference was observed between the Control treatment and the Ammonia/ammonium hydroxide sample for the tube bind testing. Only the sodium carbonate treatment significantly increased cook yields during the tube yield test (Tables 4 and 6).

Patty bind testing student's t showed there was no statistical difference between the control product and the product containing Ammonia/ammonium hydroxide; however it required greater force to break the patty (Tables 6 and 7). All other treatments required greater force than the product containing Ammonia/ammonium hydroxide to break the patty. The product containing sodium carbonate provided the tightest bound patty. During production, adjustments were made to the patty forming machine (Formax® Forming machine) after preparation of the control lot, was made which could account for some of the control patties being the easiest to break. Holes were observed during cooking in the control and product containing Ammonia/ammonium hydroxide. Ammonia/ammonium hydroxide samples cracked more compared to all other treatments.

Patty cook yields were collected on ten patties cooked together and was repeated 3 times. Because only 3 measurements collected, statistical analysis was not performed on the patty cook yields. All treatments resulted in at least a 2% higher cook yield when compared to the control FTB product (Table 8). Sodium carbonate treatment was the only treatment that increased cook yield when compared to the product containing Ammonia/ammonium hydroxide. The sodium carbonate cook yield was significantly increased by 2.7% compared to the control product. The eighty individual cooked patties proved increasing pH of FTB increased patty cook yields (Tables 9, 10). No difference in cook yields was observed between the Ammonia/ammonium hydroxide and sodium carbonate for individual cook yields.

Example Set II

A. Finely Textured Beef Preparation—Set

Finely Textured Beef was prepared, with addition of the processing aid ingredients as follows:

Test Lot 6 (T6)—Control (no added processing aids)

Test Lot 7 (T7)—Ammonia/ammonium hydroxide (FTB sourced from Beef Products, Inc.)

Test Lot 8 (T8)—Sodium Carbonate

A meat formulation for incorporation of processing aides as noted above was prepared as follows:

a. Two pound batch was made for each treatment with a target of 73% lean.

b. Formula

TABLE 11

Meat formulation for inclusion of processing aides

| Meat Block | % Meat Block | % Total Formula | Pounds per batch |
|---|---|---|---|
| 90's | 11.17 | 24.56 | 0.49 |
| 50's | 47.92 | 41.00 | 0.82 |
| FTB | 40.91 | 20.00 | 0.40 |
| Salt | 1.75 | 1.5 | 0.03 |
| Water | 14.61 | 12.50 | 0.25 |
| Phosphate 450 super | 0.51 | .44 | 0.01 |
| Total | 116.88 | 100.00 | 2.0 | c. the 90's and 50's were ground using ⅜ inch plate d. All ingredients were weighed for treatment batch and then mixed in a kitchen mixer for 2 minutes.

e. all batches were then ground using ⅛ inch plate.

f. the final products were vacuum package and held overnight.

Samples were analyzed as follows:

pH was measured on each sample.

Cook yields and bind testing were carried out using the following procedure:

a. Twenty 40 gram of samples of each treatment were weighed into 50 ml centrifuge tubes. All sample tubes treatments were evenly dived into five different batches to generate 5 replication of testing.

b. All samples were centrifuged to a speed of 1000 rmp for 1 second to achieve same level of compaction.

c. Each replication of sample tubes was cooked for 1 hour in a water bath at 160° F.

d. Following cooking all samples were centrifuged at 3500 rmp for 2 minutes.

e. Supernatant was removed from the meat plug.

f. Samples were refrigerated overnight g. Meat plug was weighed to determine cook yield.

h. Shear force analysis was completed in duplicate on each meat plug.

C. Results

TABLE 12

Product pH

| Treatment | pH |
|---|---|
| T8 Sodium Carbonate | 6.67 |
| T6 Control | 6.37 |
| T7 Ammonia/ammonium hydroxide | 6.73 |

Adding sodium carbonate to the FTB sample increased the pH of the formulated meat product when compared to the control, but the resulting pH of the final mixed product is still less than the Ammonia/ammonium hydroxide product.

TABLE 13

Product cook Yield %

| Treatment | Least Sq Mean | Std Error | Mean |
|---|---|---|---|
| T6 Control | 89.32 | 0.821 | 89.32 |
| T7 Ammonia/ammonium hydroxide | 87.68 | 0.868 | 87.68 |
| T8 Sodium Carbonate | 91.44 | 0.821 | 91.44 |

TABLE 14

| Treatment | Level | Least Sq Mean |
|---|---|---|
| LSMeans Differences Student's t | | |
| T8 Sodium Carbonate | A | 91.44 |
| T6 Control | A B | 89.32 |
| T7 Ammonia/ammonium hydroxide | B | 87.68 |

Levels not connected by same letter are significantly different. α = 0.050

The sodium carbonate treated samples had an improved cook yield as compared to the control and the Ammonia/ammonium hydroxide product, but was not statically different from the Ammonia/ammonium hydroxide product.

TABLE 15

Sample performance data

| Treatment | Average of Springiness | Average of Cohesiveness | Average of Gumminess | Average of Chewiness | Average of Resilience | Average of Hardness |
|---|---|---|---|---|---|---|
| T6 Control | 0.830 | 0.526 | 5493.07 | 4553.17 | 0.237 | 10406.86 |
| T7 Ammonia/ ammonium hydroxide | 0.813 | 0.458 | 4049.71 | 3289.57 | 0.197 | 8794.81 |
| T8 Sodium Carbonate | 0.825 | 0.497 | 4146.77 | 3421.60 | 0.218 | 8306.60 |

The product comprising the control FTB samples exhibited higher hardness values as compared to the Ammonia/ammonium hydroxide containing product, meaning that the control final product was much firmer than the Ammonia/ammonium hydroxide product. The possible reasons for these results is particle size or cook yield difference. The product made using the FTB sample comprising sodium carbonate was not as hard as the product made using the Control FTB product.

These results indicate that the use of sodium carbonate in an FTB material improves the product quality of the final mixed product. In an aspect, the use of sodium carbonate in an FTB material improves cook yields as compared to like products not containing sodium carbonate (i.e. the control), and instead containing Ammonia/ammonium hydroxide.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method for converting animal trimmings to a finely textured beef product comprising: (a) heating ground animal trimmings to a temperature sufficient to liquefy fat in the animal trimmings and less than a temperature to significantly cook the animal trimmings thereby forming a heated slurry; (b) separating at least a portion of the liquid fat from the heated slurry to form a lean textured beef slurry having a fat content of less than about 30% by weight; and (c) adding sodium carbonate to the lean textured beef slurry in an amount effective to adjust the lean textured beef slurry to a pH of from about 6.5 to about 8, wherein the sodium carbonate is added in an amount of from about 0.02 to about 0.1% by weight to provide a finely textured beef product; wherein non-meat sourced processing aids used in the present method consist of sodium carbonate and water, and wherein the cohesive properties of final mixed meat products comprising the finely textured beef product are improved as compared to like final mixed meat products comprising finely textured beef product comprising sodium metasilicate, potassium hydroxide, Ammonia/ammonium hydroxide, or untreated finely textured beef product.

2. The method of claim 1, wherein the finely textured beef product comprises sodium carbonate in an amount of from about 0.03 to about 0.05% by weight.

3. The method of claim 1, wherein the finely textured beef product has a fat content of less than about 25% by weight.

4. The method of claim 1, wherein the finely textured beef product has a fat content of from about 1 to about 10% by weight.

5. The method of claim 1, wherein the finely textured beef product has a fat content of from about 1 to about 7% by weight.

6. The method of claim 1, wherein the finely textured beef product has a fat content of from about 1 to about 5% by weight.

7. The method of claim 1, wherein sodium carbonate and water are the only non-meat sourced ingredients present in the finely textured beef product.

8. A method for converting animal trimmings to a finely textured beef product comprising: (a) heating ground animal trimmings to a temperature sufficient to liquefy fat in the animal trimmings and less than a temperature to significantly cook the animal trimmings thereby forming a heated slurry; (b) separating the heated slurry into a solids stream and a liquids stream, the solids stream comprising an increased weight percent of protein compared with the weight percent of protein in the heated slurry, and the liquids stream containing an increased weight percent of fat and water soluble proteins compared with the weight percent of fat and water soluble protein in the heated slurry; (c) separating the liquids stream into a heavy phase and a light phase, the heavy phase comprising an increased weight percent of moisture and water soluble proteins compared to the weight percent of moisture and water soluble proteins in the liquids stream, and the light phase containing an increased weight percent of tallow compared with the weight percent of fat in the liquids stream; and (d) combining the solids stream from the heated slurry and the heavy phase from the liquids stream thereby forming a finely textured beef product; wherein sodium carbonate is added to the solids stream after separation from the heated slurry or to the finely textured beef product in an amount effective to adjust the lean textured beef slurry to a pH of from about 6.5 to about 8, wherein the sodium carbonate is added in an amount of from about 0.02 to about 0.1% by weight to provide a finely textured beef product; wherein non-meat sourced processing aids used in the present method consist of sodium carbonate and water, and wherein the cohesive properties of final mixed meat products comprising the finely textured beef product are improved as compared to like final mixed meat products comprising finely textured beef product comprising sodium metasilicate, potassium hydroxide, Ammonia/ammonium hydroxide, or untreated finely textured beef product.

9. The method of claim 8, wherein the finely textured beef product comprises sodium carbonate in an amount of from about 0.03 to about 0.05% by weight.

10. The method of claim 1, wherein sodium carbonate is added to the lean textured beef slurry in an amount effective to adjust the lean textured beef slurry to a pH of from about 7 to about 7.5 to provide a finely textured beef product.

11. The method of claim 8, wherein sodium carbonate is added to the solids stream after separation from the heated slurry or to the finely textured beef product in an amount effective to adjust the lean textured beef slurry to a pH of from about 7 to about 7.5 to provide a finely textured beef product.

The following is an examiner's statement of reasons for allowance:

Schaefer discloses a process for making a FTB product as claimed, without addition of sodium carbonate.

12. The method of claim 8, wherein the finely textured beef product has a fat content of less than about 25% by weight.

13. The method of claim 8, wherein the finely textured beef product has a fat content of from about 1 to about 10% by weight.

14. The method of claim 8, wherein the finely textured beef product has a fat content of from about 1 to about 7% by weight.

15. The method of claim 8, wherein the finely textured beef product has a fat content of from about 1 to about 5% by weight.

\* \* \* \* \*

UNITED STATES PATENT AND TRADEMARK OFFICE
CERTIFICATE OF CORRECTION

PATENT NO. : 10,980,259 B1
APPLICATION NO. : 15/674223
DATED : April 20, 2021
INVENTOR(S) : Ted L. Brown It is certified that error appears in the above-identified patent and that said Letters Patent is hereby corrected as shown below:

In the Specification

In Column 1, Line 30, delete "hit" and insert -- fat -- therefor.

In the Claims

In Column 16, Lines 18-21, between Claims 11 and 12, delete "The following is an examiner's statement of reasons for allowance: Schaefer discloses a process for making a FTB product as claimed, without addition of sodium carbonate.".

Signed and Sealed this
Sixth Day of August, 2024

Katherine Kelly Vidal
*Director of the United States Patent and Trademark Office*